United States Patent Office 3,567,756
Patented Mar. 2, 1971

3,567,756
PRODUCTION OF LOWER TRIALKOXY SILANES
Wilfried Rothe, Strotzbach, Germany, assignor to Deutsche Gold- und Silber - Scheideanstalt vormals Roessler, Frankfurt am Main, Germany
No Drawing. Filed Sept. 4, 1968, Ser. No. 757,455
Claims priority, application Germany, Sept. 6, 1967, P 16 43 885.0
Int. Cl. C07f 7/04
U.S. Cl. 260—448.8     7 Claims

ABSTRACT OF THE DISCLOSURE

Alkoxy silanes are produced by reacting silicochloroform with the corresponding alkanols in aromatic solvents at temperatures between −40 and −90° C. while continuously passing an inert gas through the reaction mixture to remove the HCl formed.

BACKGROUND OF THE INVENTION

Recently process have become known for the production of alkoxy silanes, the object of which is to achieve maximum yields with simply conducted reactions. For example, DAS 1,127,338 describes the reaction of steam or vapor phase alcohols with silicon to which copper or zinc has been added as catalyst and hydrogen in a fluidized bed. Such process has the disadvantage that the large quantities of gases employed in such fluidized bed process which are necessary to ensure rapid removal of the temperature sensitive alkoxy silanes from the reaction zone cause substantial dilution of the reaction products and their recovery in liquid form is complicated and subject to high losses.

U.S. Pat. No. 2,927,937 and British Pat. No. 792,853 describe processes for the production of alkylorthosilicates from silicon and alcohols in the presence of basic catalysts in ball mills. These processes are cumbersome and costly and in addition it is known that silane hydrides decompose in the presence of basic substances with evolution of $H_2$ (Houben-Weyl, "Methoden der organischen Chemie," vol. VI/2, page 100).

German Pat. 1,219,012 describes a method for the production of silanes by reaction of finely divided silicon with alcohols. The silicon which was comminuted by grinding to a particle size of 100 to 0.1μ is dispersed in liquid organic diluents, such as, hydrocarbons, esters, ethers, ketones, acetals and the like, and reacted with, for example, methanol in the absence of a catalyst at 100° C. and a gauge pressure of 25 to 30 atmospheres. The decompressed gas was frozen out and a liquid mixture of 2% of $H_3Si(OCH_3)$, 10% of $H_2Si(OCH_3)_2$, 48% of $HSi(OCH_3)_3$, 5% of $CH_3OH$, 10% of $Si(OCH_3)_4$ and 25% of a mixture of $C_2H_5Si(OCH_3)_3$ and $(CH_3O)_4Si_2H_2$ was obtained. Conversions of this type always result in similar mixtures from which the interesting component or components—usually those with a functional S—H bond—must be recovered by distillation. Yields with reference to the silicon converted are not given.

It furthermore is known that trialkoxy silanes can be prepared in a 45% yield by reacting $HSiCl_3$ in benzene with ethanol, as the lowest alcohol (see M. E. Havill et al., J. Org. Chem. vol. XIII, pages 280–283, 1947). It was observed that the yield of trialkoxy silane decreased with decreased carbon content of the alcohol.

DESCRIPTION OF THE INVENTION INCLUDING PREFERRED EMBODIMENTS

According to the invention it was unexpectedly found that alkoxy silanes, including trimethoxy silanes, could be produced in good yields and with excellent purity by reacting silicochloroform with the corresponding alkanol in aromatic solvents at temperatures of −40 to −90° C. while simultaneously continuously passing an inert gas through the reaction mixture to remove the HCl which is formed.

Alkanols of 1 to 4 carbon atoms and, preferably, methanol and ethanol are employed for the reaction. It is not necessary that they be dried especially.

Such aromatic solvents can be employed as are still liquid in the presence of silicochloroform at the temperatures employed. Even such aromatic solvents which in themselves are solid at −40° C., such as, o- and p-xylene, can be employed as they remain liquid in the presence of silicochloroform. Toluene, xylenes, ethyl benzene, mesitylene and isopropyl benzene are especially suited for the process. However, the suitability of any particular aromatic solvent can be ascertained by simple experiment as to whether it remains liquid in the presence of silicochloroform at −40° C.

Silicochloroform is reacted with the alcohols in stoichiometric quantities. A small excess of about 10% can be employed. The volumetric ratio of silicochloroform to the solvent is between about 1:5 and 1:15. This, together with the continuous passage of an inert gas through the reaction mixture during the reaction, renders it possible to maintain a low HCl concentration.

The reactions which occur in addition to that producing $HSi(OCH_3)_3$, namely, $$HSi(OCH_3)_3 + HCl \rightarrow ClSi(OCH_3)_3 + H_2$$

and $$ClSi(OCH_3)_3 + CH_3OH \rightarrow Si(OCH_3)_4 + HCl$$

are more dependent on temperature than the main reaction so that only very slight formation of tetraalkoxy silanes and chlorotrialkoxy silanes occurs.

The mixture of reaction products obtained in the solvent is first freed of residual HCl and chlorine containing alkoxy silanes in a fractionating column under slightly reduced pressure and subsequently subjected to normal distillation. For instance, trimethoxy silane distills over practically chlorine free at 84° C. and 760 mm. Hg and can thus be obtained, for example, in over 99.5% purity.

The minimum yields of alkoxy silanes with reference to silicochloroform in the process according to the invention are over 80 wt. percent.

The following examples will serve to illustrate the process according to the invention.

EXAMPLE 1

300 ml. of silicochloroform were introduced into 4 liters of xylene which had previously been cooled to −50° C.

Then 380 ml. of methanol were added gradually while maintaining such temperature and while stirring vigorously and bubbling nitrogen therethrough. The reaction mixture was then fractionally distilled whereby initially the residual HCl and chlorosilane were distilled off at 50 torr. The main fraction of trimethoxy silane distilled over at 84° C. at 760 torr. The yield was 85.4% of theory.

When the reaction was carried out as described above but at a temperature of +20° C., the yield obtained was only 25.9%.

EXAMPLE 2

450 ml. of silicochloroform were dissolved in 6 liters of isopropyl benzene and then reacted with 1050 ml. of ethanol at −60° C. over a period of 12 hours with vigorous stirring while passing nitrogen through the reaction mixture. Subsequent fractionation as in Example 1 after separation of the first runnings gave a 91% of theoretical yield of triethoxy silane.

EXAMPLE 3

600 ml. of silicochloroform were dissolved in 3 liters of xylene in the volumetric ratio 1:5 which had previously been cooled to —40° C. In accordance to the Examples 1 and 2, 467 ml. of propanol were added gradually. The reaction mixture was then distilled. After distillation of the solvent one yields pure tripropoxysilane B.P. 760 194–196° C. in quantities of 88% of theory.

EXAMPLE 4

600 ml. of silicochloroform were dissolved in 3 liters of xylene in the volumetric ratio 1:5 which had previously been cooled to —40° C. In accordance to the Examples 1 to 3 575 ml. butanol were added gradually. After 12 hours reaction time and distillation of xylene there was obtained pure tributoxy silane B.P. 760 239° C. in yields of 93% of theory.

I claim:

1. In a process for the production of trialkoxy silanes by reaction of silicochloroform with the corresponding alkanols of 1 to 4 carbon atoms, the step of carrying out the reaction of the alkanol with the silicochloroform in an aromatic solvent at a temperature between —40 and —90° C. while continuously passing an inert gas through the reaction mixture to remove the HCl formed, the reaction mixture being liquid at the temperature employed.

2. The process of claim 1 in which the ratio of silicochloroform to the solvent is between about 1:5 and 1:15 by volume.

3. The process of claim 2 in which the solvent is selected from the group consisting of toluene, xylenes, ethyl benzene, mesitylene and isopropyl benzene.

4. The process of claim 3 in which the alkanol is selected from the group consisting of methanol and ethanol.

5. The process of claim 4 in which temperature employed is between about —50 and —60° C.

6. A process according to claim 1 wherein the alkanol is selected from the group consisting of methanol, ethanol, propanol and butanol and the yield of trialkoxy silane is over 80 weight percent.

7. A process according to claim 6 where the alkanol is methanol.

References Cited

Bazant et al., "Organosilicon Compounds," vol. 1, Academic Press, N.Y. (1965), pp. 51–53.

TOBIAS E. LEVOW, Primary Examiner

P. F. SHAVER, Assistant Examiner